United States Patent Office 2,986,539
Patented May 30, 1961

2,986,539
POLYAMIDE-EPOXY ADHESIVE

Lester E. Schniepp, Raymond E. Mietz, and James H. Groves, Barrington, Ill., assignors to American Can Company, New York, N.Y., a corporation of New Jersey No Drawing. Filed Mar. 7, 1957, Ser. No. 644,440

7 Claims. (Cl. 260—18)

The present invention pertains to a novel and improved synthetic resin adhesive and in particular to a metal-to-metal adhesive formed by reacting an epoxy resin and a specific polyamide resin.

Organic adhesives, including those for bonding together metals, are known in the art. United States Patent 2,705,223 discloses epoxy-polyamide reaction products useful as adhesives. Copending applications of J. H. Groves, Serial Number 385,887, filed October 13, 1953, now Patent 2,840,262, and of J. H. Groves and G. G. Wilson, Serial Number 395,264, filed November 30, 1953, now Patent 2,839,219, disclose polyamide metal-to-metal adhesive.

Among the difficulties experienced with prior art adhesives, such as those disclosed in the above mentioned patent and applications, are relatively low bond strengths—considerably below that of metallic solder in bonding metal surfaces—relatively slow setting, and/or low resistance to attack and weakening by certain solvents and chemical agents.

It is therefore an object of the present invention to provide a novel and improved quick setting, high strength, resistant organic adhesive.

Another object is to provide an organic adhesive of the character described which can be rapidly and efficiently applied to the surfaces to be bonded and, in particular, to the metal layers forming the side seam of a sheet metal can body.

A further object is to provide an organic adhesive of the class described which is well suited for bonding together the layers of metal in the side seam of a sheet metal can body.

Numerous other objects and advantages of the invention will be apparent as it is better understood from the following description which is of a preferred embodiment thereof.

We have discovered that the above objects can be accomplished by using as an adhesive the reaction product of from 1.5 to 10.5% by weight of a particular epoxy resin and 89.5 to 98.5% by weight of a particular polyamide resin.

The epoxy resins operable in the present invention belong to the class of complex, polymeric epoxy-hydroxy ethers resulting from the catalyzed reaction of a polyhydric alcohol, e.g. glycols, glycerine, trimethylol propane, polyhydric phenols, polyphenols, with an excess of an epoxide, e.g. epihalohydrins, alkylene oxides, as described in United States Patents 2,456,408 and 2,592,560, issued to S. O. Greenlee. The principal product of this reaction is a resinous epoxy glyceryl polyether comprising epoxy glyceryl radicals, hydroxy or chlorine substituted glyceryl radicals and the divalent hydrocarbon residue of the polyhydric alcohol all united in a chain through ether oxygen atoms. From this class of polymeric epoxy-hydroxy ethers, only those are operable that have an epoxide equivalent weight, i.e. number of grams of resin containing one gram-equivalent of epoxide, of about from 140 to 525 and have an average molecular weight of about from 275 to 1000.

The polymeric epoxy-hydroxy ethers of the instant invention may be represented by the following structural formulas:

Polyether I

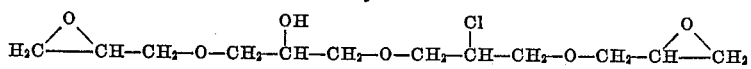

which is the reaction product of glycerine and epichlorohydrin and has an epoxide equivalent weight of 148; and Polyether II

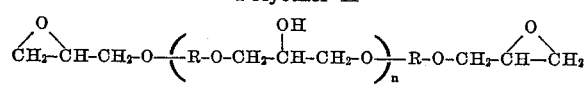

where $n$ is zero or a positive number (whole or fractional) less than 3 and R is the hydrocarbon radical of p,p'-dihydroxy-diphenyl-dimethyl methane (Bisphenol-A). Polyether II is the reaction product of Bisphenol-A and epichlorohydrin and has an epoxide equivalent weight of about from 175 to 525 and an average molecular weight of about from 350 to 1000.

The polyamide resin operable in the present invention is the reaction product of two specific polyamide resins, hereinafter referred to as resin A and resin B. Both of these resins are prepared at least in part from polymeric fat acids. These polymeric fat acids may be either saturated or unsaturated and may be derived by the thermal polymerization or catalytic polymerization of higher fatty acids such as those having 12 to 22 carbon atoms. Acids derived from drying or semi-drying oils are especially suitable and include soybean, linseed, tung, perilla, oiticica, cottonseed, corn, tall, sunflower, safflower, dehydrated castor oil acids and the like. Linoleic acid is widely available from natural sources and is especially suitable for preparation of polymeric fat acid. Monoolefinic acids such as oleic may also be dimerized for this purpose but usually by a catalytic process.

The polymeric fat acids usually obtained from a mixture of fat acids will be composed of a very large proportion of dimeric fat acids together with some higher polymeric fat acids and some residual monomer. Some monomer is desirable in the mixed acids for the purpose of controlling polymer size in the polyamide reaction. Monomer may be either removed from the polymeric fat acids or added thereto until a desired quantity is present.

POLYAMIDE RESIN A

Polyamide resin A is a condensation product of polymeric fat acids and a polyalkylene polyamine. Suitable polyalkylene polyamines include diethylene triamine, triethylene tetramine, tetraethylene pentamine, 3,3'-iminobispropylamine, and the like. Thus these polyalkylene polyamines contain two primary amine groups and from one to 3 secondary amine groups, all separated by short chain alkylene groups having 2 to 4 carbon atoms. The ratio of equivalents of polyamine to equivalents of carboxyl should be such that cross linking and hence gelation are avoided. For example in the case of diethylene triamine a ratio of 1½ equivalents of amine to 1 equivalent of carboxyl is preferred, taking into account the total carboxyl in the polymeric fat acid mixture including the monomer as well as the higher polymers present. In the case of triethylene tetramine a higher amine ratio such as 2.6 equivalents of amine per equivalent of carboxyl is preferred. In general, the higher the amine functionality of the polyamine the higher the ratio of amine equivalents per carboxyl equivalent that is required to produce a non-gelling polyamide. Accordingly the particular excess of amine to be employed in each instance can readily be determined. Usually it is not necessary to go outside the range of 1.3 to 3.0 equivalents of amine per equivalent of carboxyl.

The polymeric fat acids either in the form of the free acid or in the form of the lower alkyl esters thereof are reacted with the polyalkylene polyamine at a temperature of around 200° C. After about 2 hours at this reaction temperature the reaction mixture is subjected to a vacuum for the purpose of removing the volatile by-products of reaction. The condensation involves principally the primary amine groups but to some extent the secondary amine groups are also involved in the reaction.

At room temperature these resins are soft, tacky and resistant to greases, oils, water, water vapor, alkali, can-packing brines and syrups, and a number of organic solvents. The resins have an average molecular weight within the range of 2,500 to 6,500 and an acid number usually below 10.

The condensation reaction by which resin A is formed involves to an appreciable extent the secondary amine groups as well as the primary amine groups. By subjecting the resin to a bodying treatment at an elevated temperature within the range of about from 200–300° C. for a period of about from 6–30 hours, it is possible to effect amide interchange between the secondary and primary amine groups within resin A itself such that the characteristics of the resin are materially modified. It is found that the number of free secondary amine groups in the polyamide increases materially while the number of free primary amine groups decreases materially. The bodying is accompanied by some slight reduction in the acid number but this is not appreciable. This bodying treatment also affects the physical properties of the resin. It is found that there is a significant change in the viscosity of the resin. This increase in viscosity, as a result of the bodying treatment, may be from 1 to 2 letters on the Gardner-Holdt viscosity scale as determined on a 35% solution by weight in butanol-toluene, 1-1 or an increase of approximately 200 cps. on the Brookfield scale (20 r.p.m. 370° F. #4 spindle). It has been determined that for the purpose of the present invention the preferred compositions are those in which resin A has been heat bodied to a Gardner-Holdt viscosity between C and F and especially those bodied to between D and E.

POLYAMIDE RESIN B

Polyamide resin B is a high-melting brittle polyamide resin derived from a mixture of polymeric fat acids similar to those used in preparing resin A and an additional polycarboxylic acid, the latter having at least 2 carboxyl groups which are separated by at least 3 and not more than 8 carbon atoms. Typical of such polybasic acids are the aliphatic acids, glutaric, adipic, pimelic, suberic, azelaic, and sebacic, and the aromatic acids, terephthalic and isophthalic acids. Instead of the free acids, the lower aliphatic esters or the anhydrides may be used. The melting point of the copolymer resin may vary within the range of 130–210° C. depending upon the particular relative reactant ratios as well as reaction conditions. Desirable copolymers from adipic acid melt at 200–205° C.; from sebacic acid at 170–190° C.; and from terephthalic acid at 165–170° C. In general these copolymer polyamide resins B are prepared from a mixture of polycarboxylic acids containing from 85–98% by weight of fatty polymeric acids and from 2–15% by weight of the additional polycarboxylic acids.

In the preparation of resin B the mixture of polybasic acids is reacted with an alkylene diamine in which the alkylene radical has from 2 to 4 carbon atoms such as ethylene diamine; 1,2- and 1,3-diamino-propane; 1,2-, 1,3-, and 1,4-diamino-butane, and the like. The reactants are mixed in approximately equivalent quantities and heated under essentially the same conditions as have been described for resin A. However, when the condensation is substantially complete there is no need for subjecting resin B to a bodying treatment although this is permissible.

Polyamide resin B at room temperature is a very hard copolymer which has good resistance to greases, oils, water and water vapor, alkalies, mild acids, can-packing brines and syrups, alcohols, and most organic solvents. The average molecular weight of resin B is from 7,000 to 10,000.

Resin A and resin B are then blended and subjected to an additional amide interchange reaction between the amino groups of both resins. For this purpose the resins are mixed in the relative proportions by weight of from 60–75% of resin A and from 25–40% of resin B and preferably in the proportion of 65% of resin A to 35% of resin B. It was found that if the amount of resin A is greater than 75% of the composition the resulting adhesive is too soft and lacks sufficient cohesive strength, while if the amount of resin A is less than 60% of the composition the resulting adhesive is harder and less flexible.

The blending operation is for the simple purpose of securing a homogeneous reaction mixture and accordingly it may be carried out in many ways. Since however, it is desirable to have the amide interchange reaction take place uniformly it is preferred to effect a homogeneous blend of the two resins as rapidly as possible. For this purpose it is preferred to melt the lower melting resin A and to disperse in this molten resin A particles or pieces of resin B. These pieces should be egg size or smaller so that they will liquify rapidly and form a homogeneous mixture before any substantial quantity of resin B which has first gone into solution, has had an opportunity to react with the resin A. The mixture is subjected to agitation to insure a homogeneous blend and the surface of the blended resins is maintained under an inert atmosphere to prevent oxidative deterioration.

Satisfactory blending can be accomplished at temperatures in the approximate range of 200–300° C. and preferably within the approximate range of 200–220° C. If blending is done below 200° C. the components lack sufficient fluidity for intimate mixing whereby a non-homogeneous composition results. When such non-homogeneous blends are then held molten at temperatures close to the melting point of the composition the higher melting resin B has a tendency to separate and form gel particles in the mass. If too high a temperature is maintained during blending, the first portions of resin B to melt may take part in the amide interchange reaction to some degree before the entire amount of resin B becomes molten, and accordingly a non-uniform product may result.

During the blending operation it is necessary only to allow sufficient time to insure a homogeneous blend. The time interval is dependent upon the temperature of blending, the size of the resin B pieces added, and the efficiency of agitation. We have found that by adding egg sized or smaller pieces of resin B to molten resin A at about 200° C. using a mechanically operated agitator a time interval of about 30-60 min. is sufficient.

The amide interchange reaction between resin A and resin B takes place readily at temperatures above approximately 200° C. and is accompanied by a rather rapid reduction in the melting point of the blends. As equilibrium is approached there is a sharp decline in the rate at which the melting point drops and consequently there is a leveling off in the curve obtained by plotting melting points against time. The product thus has a relatively stable melting point.

Further reaction is possible between the two resins which would to some extent result in a further melting point drop but the rate of this drop in melting point is very low.

A suitable temperature range for the amide interchange reaction is the range of 200-220° C. At 200° C. a period of about 16 hours is suitable while at 220° C. a time of about 1 hour is generally sufficient.

In order to determine a suitable time period at any given temperature the reaction may be carried on as follows:

The blend of resins is held at a suitable reaction temperature and a sample is withdrawn at short intervals during the process for the determination of a melting point. By following the course of the reduction in melting point it is possible to determine the point at which the rate of melting point drop decreases sharply. Heating is then discontinued and the resin composition is removed from the reaction vessel and packaged for subsequent use.

The following examples are for the purpose of describing the invention and are not to be construed as limitations thereon:

Example 1

*Preparation of resin A.*—7,615 pounds of polymeric linoleic acid, being predominately dimeric linoleic acid but containing small amounts of monomeric and trimeric linoleic acid, 456 pounds of monomeric cottonseed fatty acids and 1520 pounds of diethylene triamine were placed in a reaction vessel. The reaction vessel was then heated to about 200° C. and held there for about 3 hours, the last hour of which the vessel was maintained under vacuum. The product thus obtained had a B-C Gardner-Holdt viscosity as determined on a 35% solution in toluene-butanol, 1:1. The resin was then maintained in the reaction vessel at approximately 205° C. for about 16 hours additional at which time it had attained a D viscosity.

Example 2

*Preparation of resin B.*—In a reaction vessel, a uniform blend of acids consisting of 288.2 parts of polymeric linoleic acid, which is predominately dimeric linoleic acid with a small amount of monomeric and trimeric linoleic acid, 31.7 parts of monomeric cottonseed fatty acids and 31.7 parts of sebacic acid was raised to a temperature of about 130° C. To this heated blend of acids was added 57 parts of 74.5% ethylene diamine and the whole mixture was elevated to a temperature of about 200° C. The reaction mass was agitated to insure intimate contact of the several ingredients. This intimate mixture was maintained at approximately 200° C. for a total of about 4 hours, the last 2 hours of which it was maintained under reduced pressure. The vacuum was then broken by means of an inert gas and the heating discontinued. The product was filled into suitable containers and allowed to solidify.

Example 3

*Preparation of the polyamide resin.*—65 parts of resin A were placed in a closed reaction vessel equipped with a mechanical agitator. The charge was blanketed with an atmosphere of nitrogen and heat applied to the kettle to raise the temperature to approximately 200° C. Thereupon 35 parts of resin B which had been reduced to egg size or smaller were charged into the kettle over a period of about 150 minutes while the kettle was maintained at approximately 220° C. The mixture was agitated during this period and after all of resin B has been added, the heating was discontinued and the mixture was allowed to cool to 213° C. at which temperature it was maintained and agitated for an additional 180 minutes. Heating and agitation were then discontinued and the temperature of the blend allowed to drop to 209° C. Th vacuum was then broken and the product packaged off.

Reaction between the polyamide resin and the epoxy resin and gelation of the reaction product occurs very rapidly when the two resins are mixed as hot liquids, i.e. at temperatures about the melting point of the polyamide resin. This reaction and gelation are irreversible whereby the polyamide-epoxy reaction product becomes a thermoset material which is insoluble and highly inert. However, to prevent premature solidification, combining of the polyamide and epoxy resins under reactive conditions, i.e. heat, must take place immediately prior to applying the reactants to the surfaces to be joined and the joining of the surfaces; or the combination and reaction must take place while the surfaces to be joined are in their proper position with the adhesive disposed therebetween.

The technique we have found suitable for mixing the two resins immediately prior to application is to feed the two resins by means of pressure through separate conduits as hot liquids, i.e. 200-300° C., and merge the two liquids as they are ejected from the conduits towards the surfaces to be joined, and immediately thereafter placing the surfaces in their desired final position while the adhesive sets. The mixing and ejection may be done in a suitably designed gun or nozzle.

As a means of combining the epoxy and polyamide resins in an inactive state, applying this inactive compound to the surfaces to be joined and thereafter activating the adhesive, the cold epoxy resin may be milled into solid polyamide resin, such as on a conventional 2 roll rubber mill, until a homogeneous blend results. This blend may then be cut or formed into the desired shape, placed between the surfaces to be laminated or joined and the assembly heated to the reaction temperature of the two resins, i.e. 200-300° C.

By whatever means the epoxy resin and polyamide resin are combined and reacted, the reaction at 200 to 300° C. is very rapid causing the adhesive to solidify in about 1 second to 5 minutes and usually in 1 to 60 seconds, depending upon temperature and ratio of reactants. The adhesive bonds produced by this reaction are of high strength, i.e. peel strengths of about from 40 to 110 pounds per ¾ inch as compared with a peel strength for tin-lead solder of about 55 pounds per ¾ inch.

It has been found that products formed from a reaction mass containing less than about 1.5% by weight of epoxy resin either fail to solidify or at least are so soft as to lack cohesive strength. On the other hand, adhesives formed from a reaction mass containing greater than about 10.5% by weight epoxy resin, although showing increased strength in some respects, are too brittle and inflexible whereby they tend to fracture easily upon receiving a shock or sharp blow or upon bending.

The table below discloses specific examples of combinations of various epoxy resin in various proportions, given in percent by weight, with the polyamide resin disclosed in Example 3. The peel strength data included in the table was obtained by measuring the force required to strip apart two steel strips ¾ inch wide bonded face-to-face at one end, by pulling the free end of each strip in an opposite direction over Canco roll guides at a speed of 1 inch per minute.

TABLE

| Type of Epoxy Resin | Epoxide Equivalent Weight | Percent | Peel Strength in lbs. per .75 inch |
|---|---|---|---|
| Polyether I | 140-165 | 1.96 | 70 |
| Do | 140-165 | 4.76 | 72 |
| Polyether II | 190-210 | 2.34 | 58 |
| Do | 190-210 | 4.76 | 85 |
| Do | 190-210 | 9.10 | 107 |
| Polyether II | 225-290 | 1.96 | 40 |
| Do | 225-290 | 4.76 | 60 |
| Do | 225-290 | 10.25 | 75 |
| Polyether II | 300-375 | 4.76 | 70 |
| Do | 450-525 | 4.08 | 55 |
| Do | 450-525 | 6.98 | 65 |

Although metal-to-metal and in particular steel-to-steel adhesion has been emphasized hereinabove, it must be understood that the adhesive of the instant invention may be used to laminate a wide variety of surfaces including various metals and coated metals, wood, paper and glass.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

We claim:

1. An adhesive adapted for use in laminating, comprising the thermoset reaction product of about from 1.5 to 10.5% by weight of an epoxy resin and about 98.5 to 89.5% by weight of a polyamide resin, said reaction product resulting from the mixing of said epoxy resin and said polyamide resin in a liquid state at a temperature of from 200 to 300° C., said epoxy resin being of the class consisting of complex polymeric epoxy-hydroxy ethers resulting from the catalyzed reaction of a polyhydric alcohol with an excess of epoxide, and consisting essentially of a resinous glyceryl polyether of a member of the group consisting of polyhydric phenols and polyhydric alcohols, the epoxy resin having an epoxide equivalent weight of about 140 to 525, and an average molecular weight of about from 275 to 1,000, said polyamide resin having a substantially stable melting point when held in a molten state and comprising a homogeneous blend of from 60 to 75% by weight of polyamide resin A and from 40 to 25% by weight of polyamide resin B, said resin A being the reaction product of a polymeric fat acid and a polyalkylene polyamine, the polyalkylene polyamine being employed in a ratio of 1.3 to 3.0 equivalents of amine per equivalent of carboxylic acid, said resin A having been subjected to a bodying treatment at 200° to 300° C. of sufficient duration to bring the Gardner-Holdt viscosity to within the range C to F, said resin B being the reaction product of an alkylene diamine and a mixture of a polymeric fat acid and a polycarboxylic acid selected from the group consisting of aliphatic and aromatic polycarboxylic acids in which the carboxyl groups are separated by from 3 to 8 carbon atoms, the blend of resin A and resin B having been effected at a temperature within the approximate range of 200 to 220° C. for a time sufficient to effect an amide interchange between the resins.

2. The laminating adhesive set forth in claim 1 wherein the heat bodying of said resin A is effective to increase the viscosity by at least one letter on the Gardner-Holdt scale.

3. The laminating adhesive set forth in claim 1 wherein said resin A contains the diacyl group of dilinoleic acid and the triamino group of diethylene triamine.

4. The laminating adhesive set forth in claim 1 wherein said resin B contains the diamino group of ethylene diamine and the diacyl groups of dilinoleic acid and of sebacic acid.

5. The laminating adhesive set forth in claim 1 wherein said epoxy resin has an epoxide equivalent weight of about from 140 to 165 and is represented by the structural formula

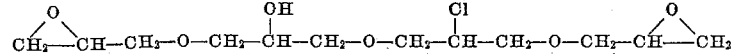

6. The laminating adhesive set forth in claim 1 wherein said epoxy resin comprises alternating esterifiable glyceryl radicals and the divalent hydrocarbon radical of p,p'-dihydroxy-diphenyl-dimethyl methane united in a chain through ether oxygen atoms and having an epoxide equivalent weight of about from 175 to 525.

7. An adhesive adapted to form a metal-to-metal laminate comprising the thermoset reaction product of about from 1.5 to 10.5% by weight of an epoxy resin and about from 89.5 to 98.5% by weight of a polyamide resin, said reaction product resulting from the mixing of said epoxy resin and said polyamide resin in a liquid state at a temperature of from 200 to 300° C., said epoxy resin consisting of a resinous glyceryl polyether of p,p'-dihydroxydiphenyldimethylmethane having an epoxide equivalent weight of about from 175 to 525, said polyamide comprising the amide interchange reaction product of 60 to 75% by weight of heat bodied resin A and 25 to 40% by weight of a resin B and having a substantially stable melting point when held in a molten state, said resin A comprising the diacyl groups of dilinoleic acid and the triamino groups of diethylene triamine and containing a substantial excess of amino groups, said resin B comprising the mixed diacyl groups of dilinoleic acid and of sebacic acid and the diamino groups of ethylene diamine.

References Cited in the file of this patent

UNITED STATES PATENTS

| | | |
|---|---|---|
| 2,193,529 | Coffman | Mar. 12, 1940 |
| 2,450,940 | Cowan et al. | Oct. 12, 1948 |
| 2,705,223 | Renfrew et al. | Mar. 29, 1955 |
| 2,707,708 | Wittcoff | May 3, 1955 |
| 2,760,944 | Greenlee | Aug. 28, 1956 |
| 2,839,219 | Groves et al. | June 17, 1958 |
| 2,867,592 | Morris et al. | Jan. 6, 1959 |

FOREIGN PATENTS

| | | |
|---|---|---|
| 516,107 | Canada | Aug. 30, 1955 |

OTHER REFERENCES

Northwestern Club, Paint, Oil and Chemical Review, November 5, 1953, pages 72, 73, 75-80.

Renfrew et al.: Industrial and Engineering Chemistry 46 (No. 10), 2226-32 (1954).

Schildknecht: "High Polymers," volume X, Interscience Publishers, Inc., New York, 1956, page 433.